US012792088B2

(12) United States Patent
Brocklesby et al.

(10) Patent No.: US 12,792,088 B2
(45) Date of Patent: Nov. 10, 2026

(54) METHODS AND SYSTEMS FOR PROVIDING LIGHTING TO EXTERIOR OF NOTEBOOK IN A CLOSED POSITION

(71) Applicant: Dell Products L.P., Round Rock, TX (US)

(72) Inventors: Brandon J. Brocklesby, Pflugerville, TX (US); Jace W. Files, Round Rock, TX (US); Chiu-Jung Tsen, Zhubei City (TW); John T. Morrison, Round Rock, TX (US); YiMing Chou, Taipei (TW)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 19/037,069

(22) Filed: Jan. 24, 2025

(65) Prior Publication Data

US 2026/0219704 A1 Jul. 30, 2026

(51) Int. Cl.
*G06F 1/16* (2006.01)

(52) U.S. Cl.
CPC .......... *G06F 1/1616* (2013.01); *G06F 1/1662* (2013.01)

(58) Field of Classification Search
CPC .... G06F 1/1616; G06F 1/1662; G06F 1/1656; G06F 1/3265
See application file for complete search history.

(56) References Cited

U.S. PATENT DOCUMENTS

| | | | | | |
|---|---|---|---|---|---|
| 5,384,459 | A * | 1/1995 | Patino | H01H 13/70 | 200/314 |
| 12,346,170 | B1 * | 7/2025 | Kapila | G06F 1/1662 | |
| 2005/0128770 | A1 * | 6/2005 | Lin | G06F 1/1616 | 362/602 |
| 2007/0024576 | A1 * | 2/2007 | Hassan | G09G 3/3208 | 348/E17.006 |
| 2013/0335329 | A1 * | 12/2013 | Freund | G06F 1/1662 | 345/168 |
| 2014/0176444 | A1 * | 6/2014 | Sultenfuss | G06F 1/1677 | 345/173 |
| 2015/0002496 | A1 * | 1/2015 | Winer | G09G 5/026 | 345/208 |
| 2019/0213567 | A1 * | 7/2019 | Hamrock | G06Q 20/20 | |
| 2020/0090884 | A1 * | 3/2020 | Chang | H03K 17/967 | |
| 2020/0285285 | A1 * | 9/2020 | Tsai | G02B 6/0011 | |

* cited by examiner

*Primary Examiner* — Abhishek M Rathod
(74) *Attorney, Agent, or Firm* — Jackson Walker L.L.P.

(57) ABSTRACT

An information handling system may include a display assembly comprising a display and a keyboard assembly rotationally coupled to the display assembly, wherein at least one of the display assembly and the keyboard assembly comprises a lightpipe configured to transmit light generated by the display through a housing of such at least one of the display assembly and the keyboard assembly when the display assembly is in a closed position relative to the keyboard assembly.

14 Claims, 4 Drawing Sheets

METHODS AND SYSTEMS FOR PROVIDING LIGHTING TO EXTERIOR OF NOTEBOOK IN A CLOSED POSITION

TECHNICAL FIELD

The present disclosure relates in general to information handling systems, and more particularly to methods and systems for providing lighting to the exterior of a notebook from a display of the notebook while the notebook is in a closed position.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a notebook computer, which may also be referred to as a laptop. A notebook may comprise a display assembly rotatably coupled to a keyboard assembly via a hinge, allowing a user to open the display assembly relative to the keyboard assembly to a desired angle, as well as close the keyboard assembly relative to the display assembly to an angle of approximately zero degrees.

Increasingly, notebooks are being designed to remain at least partially functional and undertake particular tasks when closed. For example, a notebook may playback audio or undertake other tasks while closed. Accordingly, it may be desirable to enable a user interface for receiving user input or outputting information to a user while the notebook is closed, including visual information.

Traditionally, in the closed position of a laptop, visual information is communicated through dedicated light-emitting diodes or sources of light embedded within either or both of the keyboard assembly or display assembly. However, such traditional approaches may be undesirable, as they may require circuitry for control and power, as well as their own control systems, which have cost and take up valuable space within a notebook.

SUMMARY

In accordance with the teachings of the present disclosure, the disadvantages and problems associated with traditional approaches to providing visual information to the exterior of a notebook in a closed position may be substantially reduced or eliminated.

In accordance with embodiments of the present disclosure, an information handling system may include a display assembly comprising a display and a keyboard assembly rotationally coupled to the display assembly, wherein at least one of the display assembly and the keyboard assembly comprises a lightpipe configured to transmit light generated by the display through a housing of such at least one of the display assembly and the keyboard assembly when the display assembly is in a closed position relative to the keyboard assembly.

In accordance with these and other embodiments of the present disclosure, a method may include rotationally coupling a display assembly comprising a display to a keyboard assembly and locating in at least one of the display assembly and the keyboard assembly a lightpipe configured to transmit light generated by the display through a housing of such at least one of the display assembly and the keyboard assembly when the display assembly is in a closed position relative to the keyboard assembly.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1A through 2B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

Figure 1A:
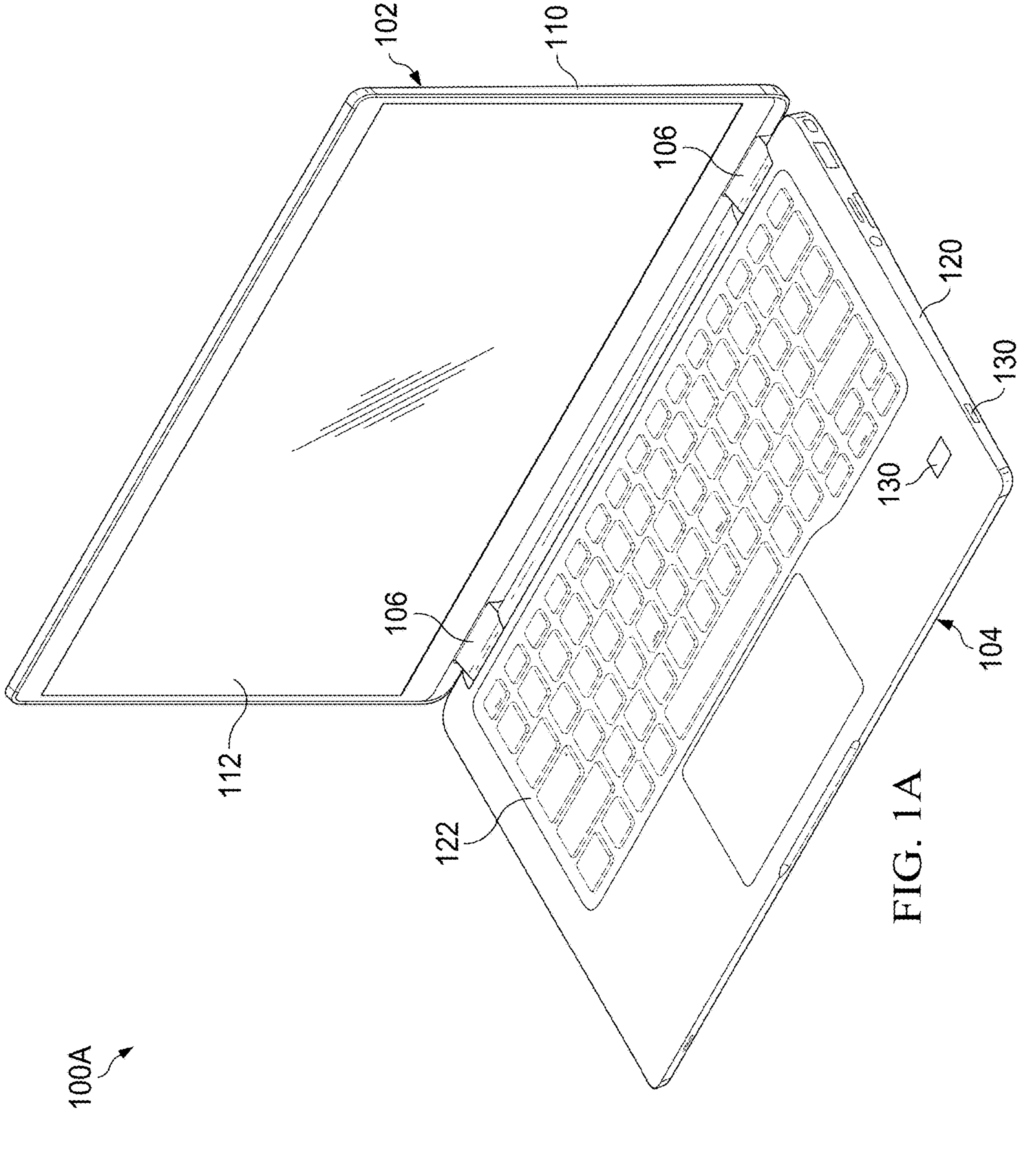
FIG. 1A illustrates an isometric perspective view of selected components of an example notebook, in accordance with embodiments of the present disclosure.
Figure 1B:
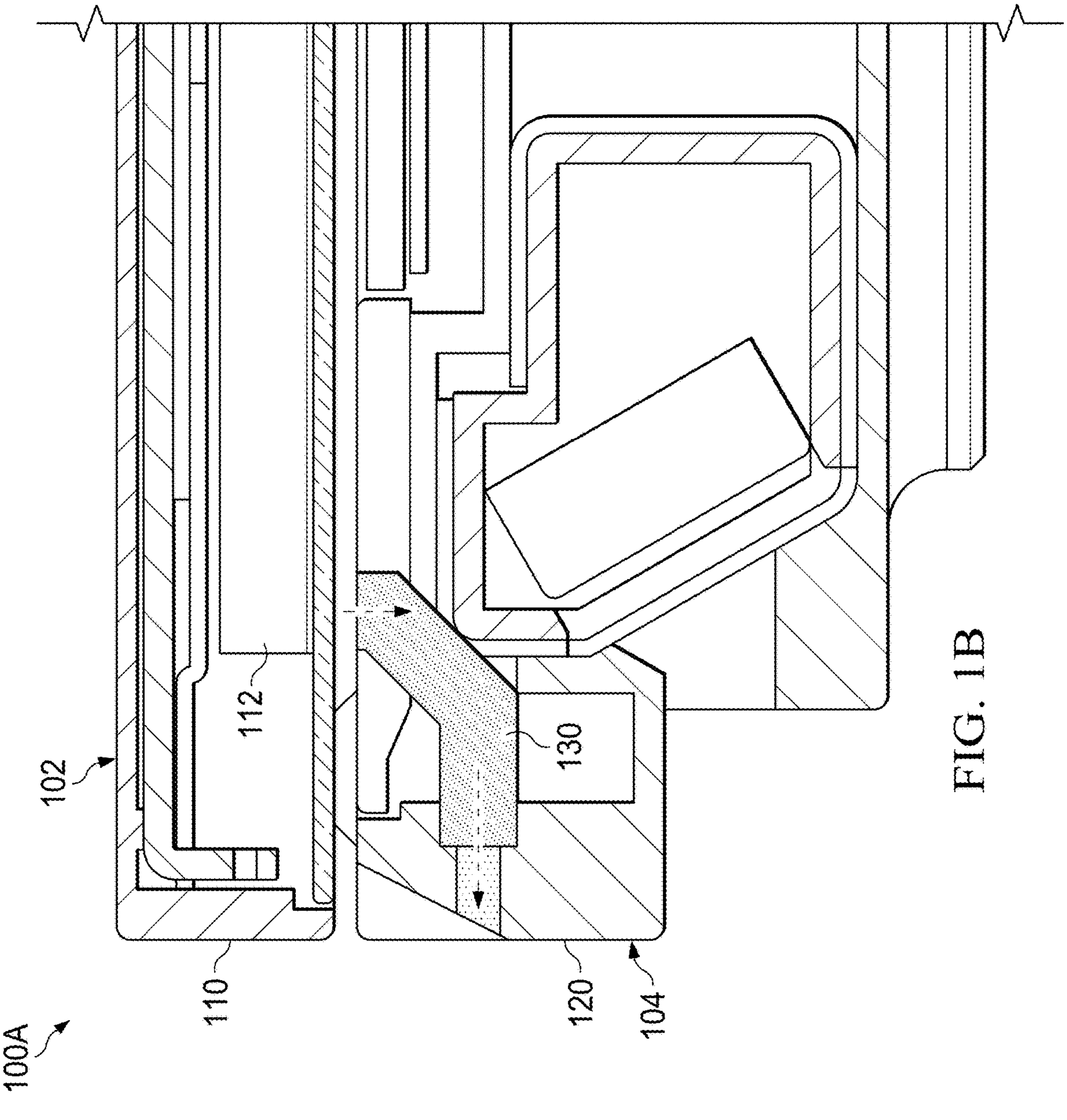
FIG. 1B illustrates a cross-sectional side elevation view of selected components of the example notebook of FIG. 1A, in accordance with embodiments of the present disclosure.

FIG. 1A illustrates an isometric perspective view of selected components of an example notebook 100A, in accordance with embodiments of the present disclosure. FIG. 1B illustrates a cross-sectional side elevation view of selected components of example notebook 100A, in accordance with embodiments of the present disclosure. FIG. 1A depicts notebook 100A in an open position while FIG. 1B depicts notebook 100A in its closed position. Notebook 100A may implement an information handling system.

As shown in FIGS. 1A and 1B, notebook 100A may include a display assembly 102 and a keyboard assembly 104 rotatably coupled to one another via one or more hinges 106. Display assembly 102 may comprise a housing 110 that may house components of notebook 100A including a display device 112 (e.g., liquid-crystal display or organic light-emitting diode display) for outputting alphanumeric and/or graphical output. Keyboard assembly 104 may comprise a housing 120 that may house components of notebook 100A including a keyboard 122 for inputting information to notebook 100A. Keyboard assembly 104 may also include other components of information handling system 102 (e.g., a processor, memory, other information handling resources, etc.) not explicitly depicted in FIGS. 1A and 1B.

As also shown in FIGS. 1A and 1B, keyboard assembly 102 may have integral thereto a lightpipe 130. Lightpipe 130 may include any system, device, or apparatus configured to transmit light in a path shown by arrows of FIG. 1B, from an "entrance" of lightpipe 130 proximate to the top (e.g., C-cover) of housing 120 to an "exit" of lightpipe 130 on a side of housing 120. Thus, lightpipe 130 may include any suitable combination of optically transmissive and/or reflective materials. Accordingly, when notebook 100A is in a closed position, areas of display 112 that are proximate to the entrance of lightpipe 130 in the closed position of notebook 100A may emit light, which may be transmitted through lightpipe 130, to enable a full range of external lighting and notification to a user at the exit of lightpipe 130. Thus, existing display 112, which would likely be otherwise without function in the closed position in traditional approaches, may be leveraged in the present disclosure as a light source to generate lighting effects external to notebook 100A in the closed position, and avoids the need for separate light sources to provide such external lighting.

Figure 2A:
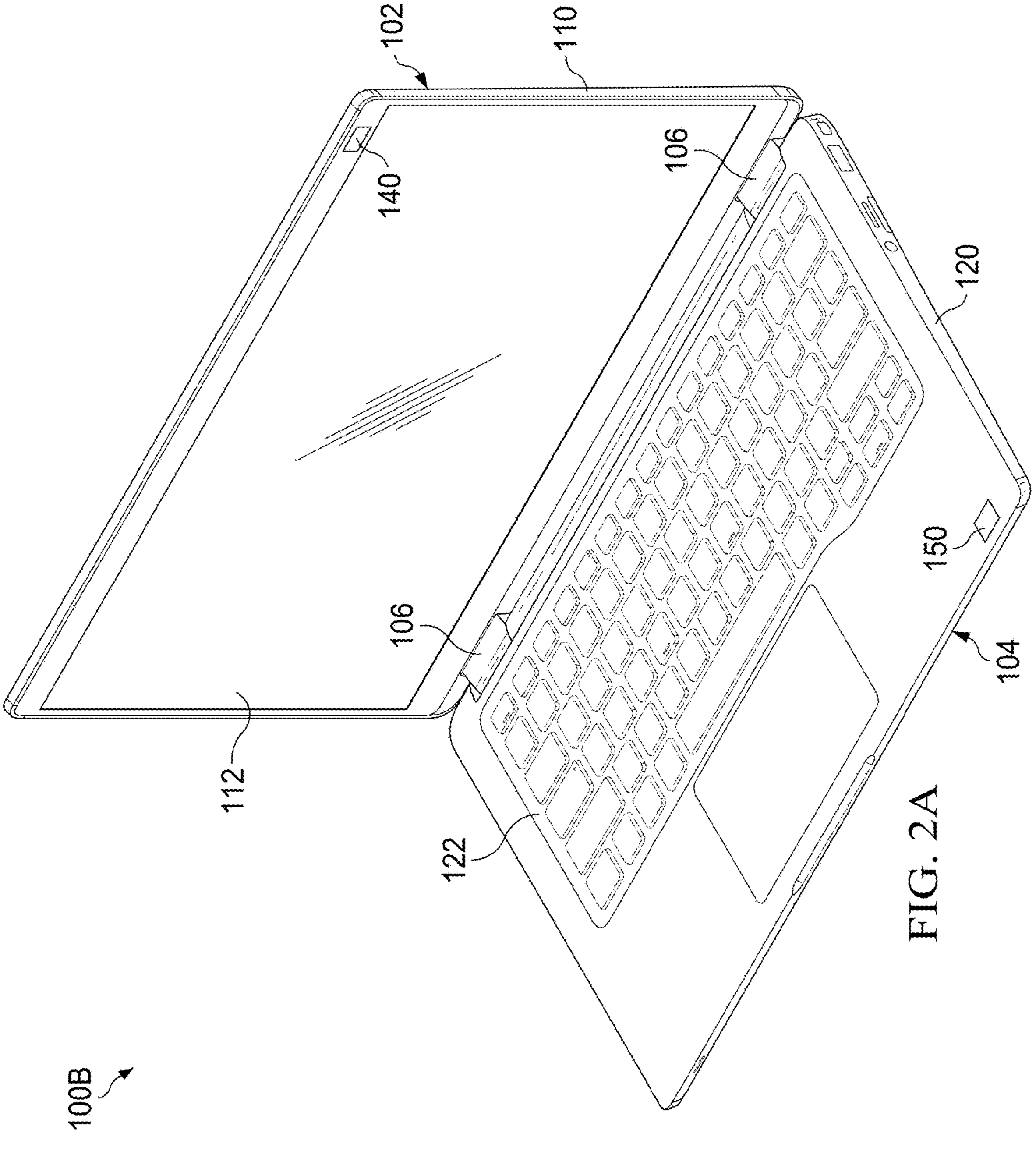
FIG. 2A illustrates an isometric perspective view of selected components of another example notebook, in accordance with embodiments of the present disclosure.
Figure 2B:
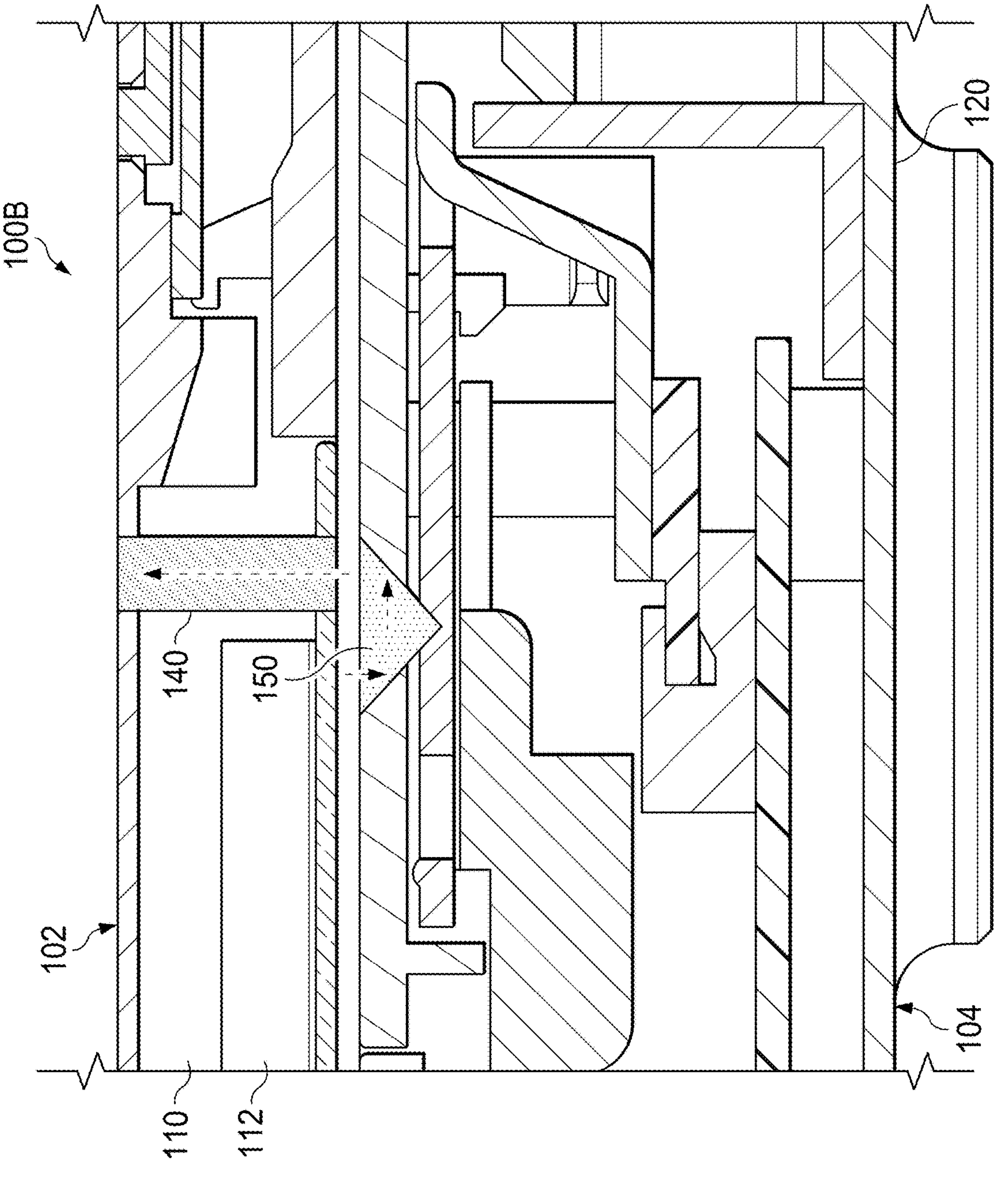
FIG. 2B illustrates a cross-sectional side elevation view of selected components of the example notebook of FIG. 2A, in accordance with embodiments of the present disclosure.

FIG. 2A illustrates an isometric perspective view of selected components of an example notebook 100B, in accordance with embodiments of the present disclosure. FIG. 2B illustrates a cross-sectional side elevation view of selected components of example notebook 100B, in accordance with embodiments of the present disclosure. FIG. 2A depicts notebook 100B in an open position while FIG. 2B depicts notebook 100B in its closed position. Notebook 100B may implement an information handling system.

Notebook 100B may be similar in many respects to notebook 100A. Accordingly, only certain differences between notebook 100A and notebook 100B are described below. In particular, notebook 100B may include reflective component 150 and lightpipe 140 in lieu of lightpipe 130.

As shown in FIGS. 2A and 2B, reflective component 150 may be located on a top surface (e.g., C-cover) of housing 120 and may include any system, device, or apparatus configured to receive and reflect light in a path shown by arrows of FIG. 2B, such that light incident on reflective component 150 reflects in a direction substantially parallel to and opposite from the direction of incidence, but offset by a particular distance.

Lightpipe 140 may include any system, device, or apparatus configured to transmit light in a path shown by arrows of FIG. 2B, from an "entrance" of lightpipe 140 proximate to a bottom (e.g., B-cover) of housing 110 to an "exit" of lightpipe 140 on a top (e.g., A-cover) of housing 110. Thus, lightpipe 140 may include any suitable combination of optically transmissive and/or reflective materials.

Accordingly, when notebook 100B is in a closed position, areas of display 112 that are proximate to the reflective component 150 in the closed position of notebook 100B may emit light, which may be reflected by reflective component 150 and then transmitted through lightpipe 140, to enable a full range of external lighting and notification to a user at the exit of lightpipe 140. Thus, as in notebook 100A, existing display 112, which would likely be otherwise without function in the closed position in traditional approaches, may be leveraged in the present disclosure as a light source to generate lighting effects external to notebook 100B in the closed position, and avoids the need for separate light sources to provide such external lighting.

It is understood that in some embodiments, various features of notebook 100A and notebook 100B may be combined into a single notebook. In other words, in some embodiments of the present disclosure, a notebook may include lightpipe 130, lightpipe 140, and reflective component 150 as described above.

While the terms "top," "bottom," "front," "back," and "side" are used for purposes of exposition and clarity, such terms are not intended to limit any of the components disclosed herein to a particular orientation or configuration.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:

a display assembly comprising a display; and a keyboard assembly rotationally coupled to the display assembly;

wherein at least one of the display assembly and the keyboard assembly comprises a lightpipe configured to transmit light generated by the display from an interior of a housing of said at least one of the display assembly and the keyboard assembly to an exterior surface of said housing when the display assembly is in a closed position relative to the keyboard assembly, such that the transmitted light provides external lighting or external notification to a user exterior of the information handling system in the closed position.

2. The information handling system of claim 1, wherein the keyboard assembly comprises the lightpipe.

3. The information handling system of claim 2, wherein the display assembly comprises a second lightpipe configured to transmit light generated by the display through a housing of the display assembly.

4. The information handling system of claim 1, wherein the display assembly comprises the lightpipe.

5. The information handling system of claim 4, wherein the keyboard assembly comprises a reflective component configured to reflect light generated by the display to the lightpipe when the display assembly is in a closed position relative to the keyboard assembly.

6. The information handling system of claim 1, wherein the display comprises an organic light-emitting diode display.

7. The information handling system of claim 1, wherein the display comprises a liquid crystal display.

8. A method comprising:

rotationally coupling a display assembly comprising a display to a keyboard assembly; and locating in at least one of the display assembly and the keyboard assembly a lightpipe configured to transmit light generated by the display from an interior of a housing of said at least one of the display assembly and the keyboard assembly to an exterior surface of said housing when the display assembly is in a closed position relative to the keyboard assembly, such that the transmitted light provides external lighting or external notification to a user exterior of the display assembly and the keyboard assembly in the closed position.

9. The method of claim 8, wherein locating comprises locating the lightpipe within the keyboard assembly.

10. The method of claim 9, further comprising locating a second lightpipe within the display assembly, the second lightpipe configured to transmit light generated by the display through a housing of the display assembly.

11. The method of claim 8, wherein locating comprises locating the lightpipe within the display assembly.

12. The method of claim 11, further comprising locating a reflective component within the keyboard assembly and arranged such that the reflective component is configured to reflect light generated by the display to the lightpipe when the display assembly is in a closed position relative to the keyboard assembly.

13. The method of claim 8, wherein the display comprises an organic light-emitting diode display.

14. The method of claim 8, wherein the display comprises a liquid crystal display.

* * * * *